United States Patent [19]

Cella

[11] 4,230,527
[45] Oct. 28, 1980

[54] STEAM GENERATOR FOR USE IN NUCLEAR POWER PLANTS

[76] Inventor: Alexander Cella, Robinwood Dr., Great Notch, N.J. 07424

[21] Appl. No.: 850,647

[22] Filed: Nov. 11, 1977

Related U.S. Application Data

[63] Continuation-in-part of Ser. No. 792,195, Apr. 29, 1977, Pat. No. 4,162,191.

[51] Int. Cl.² ............................................. G21C 15/16
[52] U.S. Cl. ...................................... 176/87; 176/65; 165/163; 165/76
[58] Field of Search ................... 176/65, 87; 165/158, 165/163, 76

[56] References Cited

U.S. PATENT DOCUMENTS

| | | | |
|---|---|---|---|
| 698,290 | 4/1902 | Kelley | 165/158 |
| 1,372,010 | 3/1921 | Davis | 122/511 |
| 2,223,318 | 1/1940 | Gibb | 165/76 |
| 2,237,629 | 4/1941 | Fischer | 165/76 |
| 3,213,833 | 10/1965 | Cunningham et al. | 176/65 |
| 3,629,069 | 12/1971 | Wright | 176/87 |
| 3,713,972 | 1/1973 | Coast et al. | 176/87 X |
| 3,716,451 | 2/1973 | Van Sickel et al. | 176/87 X |
| 3,902,463 | 9/1975 | Michel | 165/518 |

FOREIGN PATENT DOCUMENTS

| | | | |
|---|---|---|---|
| 1335130 | 7/1963 | France | 165/158 |
| 1429336 | 3/1976 | United Kingdom | 165/158 |

*Primary Examiner*—Peter A. Nelson
*Attorney, Agent, or Firm*—Hubbell, Cohen, Stiefel & Gross

[57] ABSTRACT

An improved steam generator for use in a nuclear power plant of the pressurized water type in which a turbine generator is driven by the steam output of the steam generator to provide electrical power therefrom. The improvement comprises providing a vertically movable grid structure vertically extending within the interior of the lower housing portion of the steam generator through which individual tubes comprising a vertically extending tube bundle extend. The tube bundle has a tube sheet at one end thereof supporting the tube bundle for the tubes extending through the tube sheet in flow through communication with a heat exchange fluid inlet. The grid structure defines grid apertures therein through which the individual tubes extend with each of the grid apertures being in surrounding relationship with a portion of an associated one of the tubes. The grid structure is movable for a predetermined vertical extent, such as by hydraulic means, such as a piston, along the tubes for vertically displacing the means defining the grid apertures by a sufficient amount for removing the previously surrounded portion of each of the tubes from the associated grid apertures whereby an enhanced reading of the condition of the tubes at the previously surrounded portion is enabled. The steam generator may comprise vertically assemblable modules which are removably mounted together in sealing relationship, with the modules comprising a base module, a tube bundle module removably mountable on the base module in sealing relationship therewith and an uppermost drier module removably mountable on the tube bundle module in sealing relationship therewith whereby ready access to removal of the tube bundle module in situ from the nuclear power plant steam generator is facilitated.

9 Claims, 12 Drawing Figures

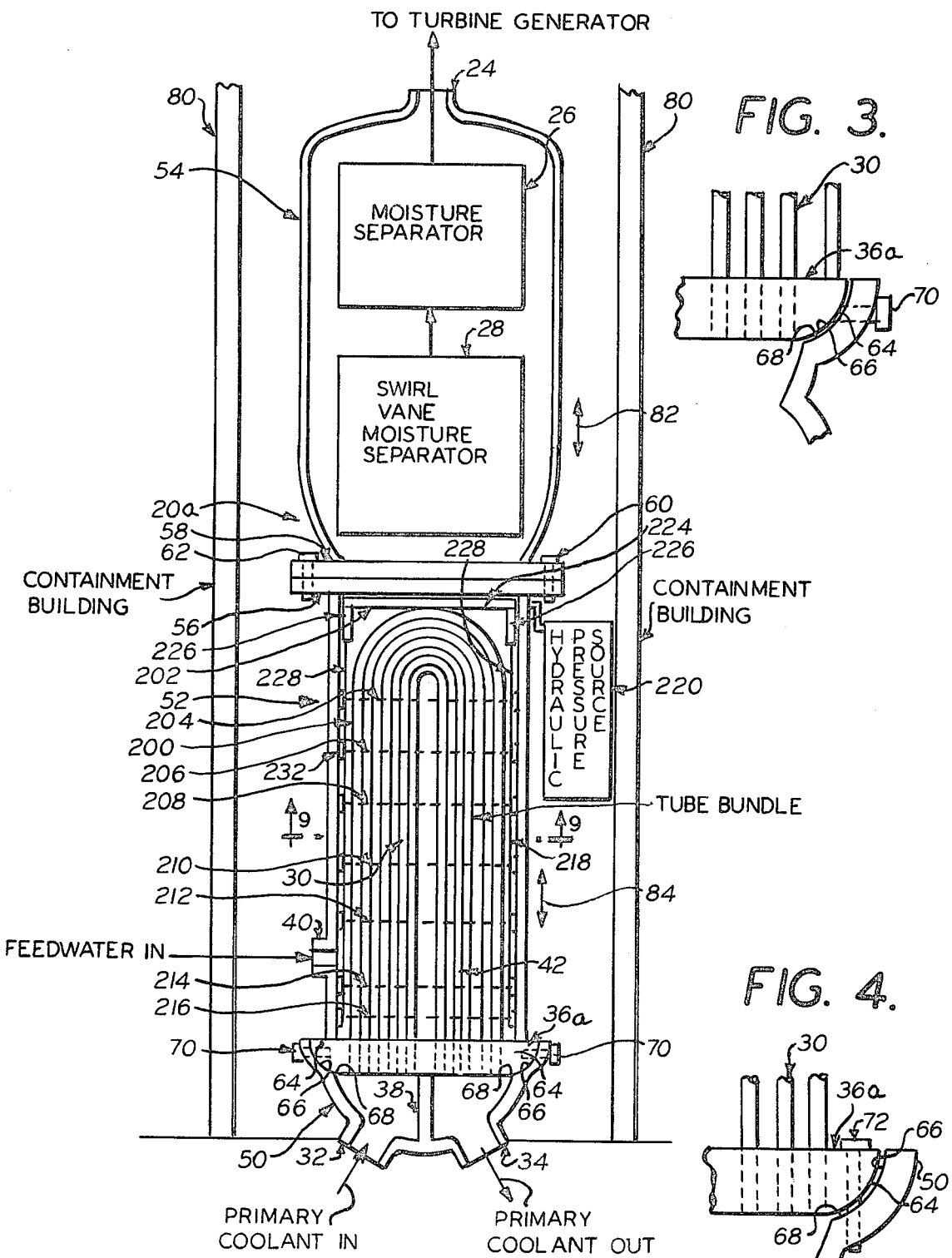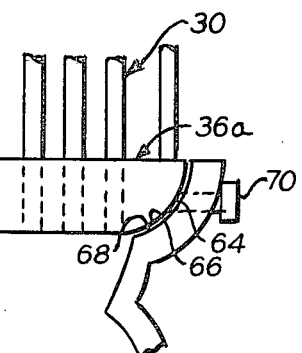

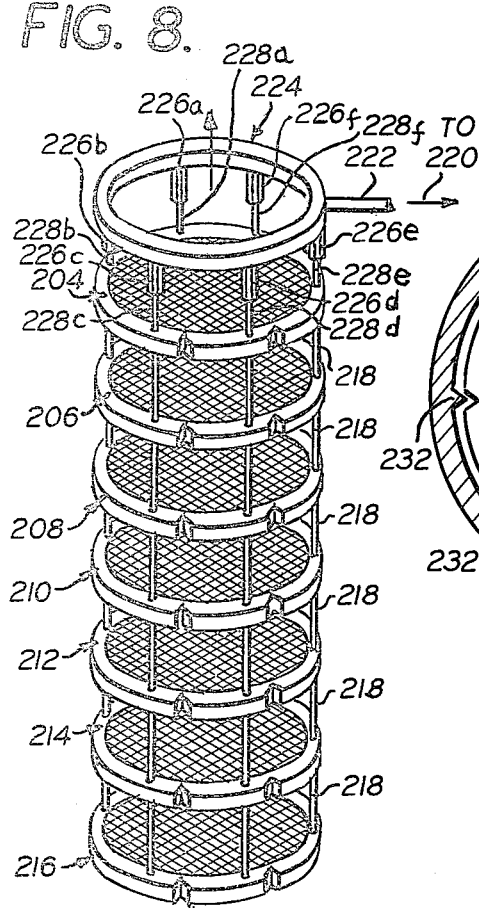
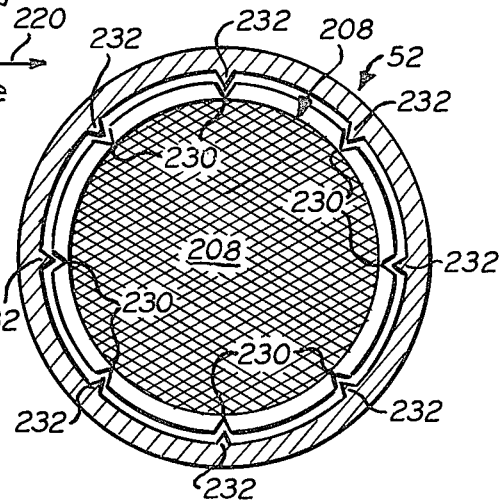
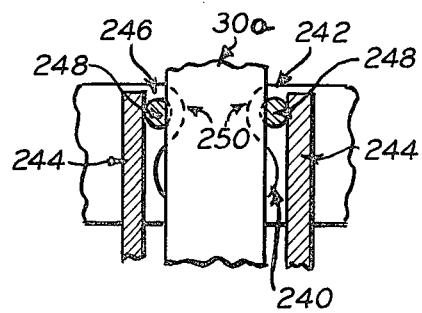
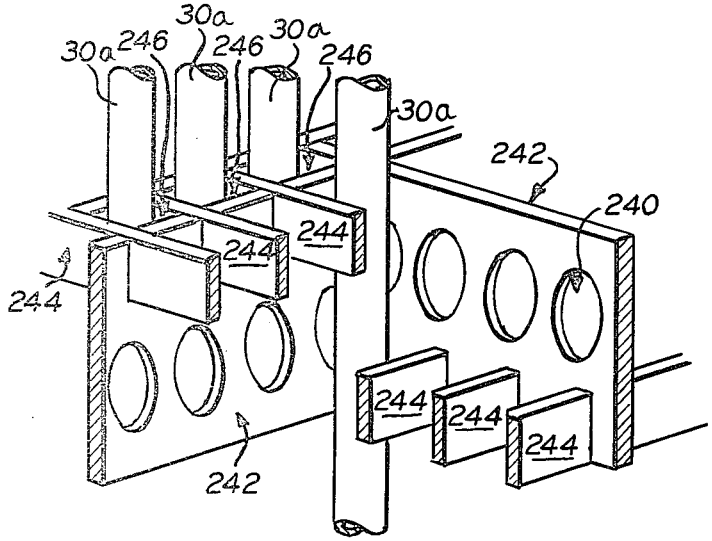
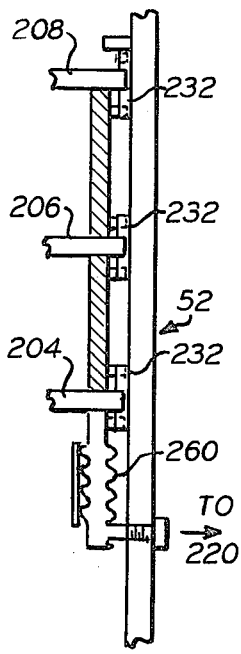

STEAM GENERATOR FOR USE IN NUCLEAR POWER PLANTS

CROSS REFERENCE TO RELATED APPLICATIONS

This application is a continuation-in-part of my co-pending U.S. patent application Ser. No. 792,195, filed Apr. 29, 1977, now U.S. Pat. No. 4,162,191, and entitled "MODULAR STEAM GENERATOR FOR USE IN NUCLEAR POWER PLANTS", the contents of which are hereby specifically incorporated by reference in their entirety.

BACKGROUND OF THE INVENTION

1. Field of the Invention

The present invention relates to steam generators and particularly to such steam generators for use in nuclear power plants.

2. Description of the Prior Art

Steam generators for use in power plants, and particularly for use in nuclear power plants are well known, such as the type of steam generator manufactured by Westinghouse. One such typical prior art steam generator is shown in FIG. 1 of the drawings. These prior art steam generators utilized in nuclear power plants are normally contained in a containment building, such as one made of concrete. Moreover, these prior art steam generators known to applicant are unitary structures comprising a housing having an upper shell and lower shell portion with a moisture separator, including a swirl vane moisture separator, normally being located in the upper shell portion and with a tube bundle normally being located in the lower shell portion. In such prior art steam generators presently employed in nuclear power plants, the steam generator is completely enclosed and is placed in the containment building prior to the concrete being poured. As a result, once the containment building is sealed there is no way to replace this steam generator without breaking or destroying the containment building. Accordingly, if there is a failure in the tube bundle, it has heretofore been necessary to break the containment building in order to repair the steam generator as that is the only manner in which access can be had to various portions of the steam generator. Moreover, failure in the tube bundle of this prior art unitary type of steam generator has required replacement of the entire steam generator in order to allow for such repair, which complete replacement is quite costly in that such a steam generator costs approximately $15,000,000 by 1976 standards.

With the widespread acceptance and use of nuclear power plants, there have been more and more such tube failures in the tube bundles of such steam generators which have required the power plant to be shut down. This, of course, can be extremely costly inasmuch as the steam generators are a vital component in the operation of the nuclear power plant. Moreover, since such nuclear power plants normally include three or four such steam generators in operation, the cost of replacement and/or repair can become quite prohibitive.

Although the use of modular housing in various types of heat exchanges has been well known, such as disclosed in U.S. Pat. Nos. 1,372,010; 2,228,549; 2,241,209; 1,564,446; 1,790,897; 973,610; 514,338 and 784,192, such techniques, to applicant's knowledge, have not been used with respect to steam generators and particularly steam generators for use in nuclear power plants, despite the serious problems encountered with respect to repair and/or replacement of these steam generators in situ.

With respect to the aforementioned failure in the tube bundle, one of its primary causes has been found to be build-up around the tubes as a result of cooling water or secondary water chemicals, such as phosphates, chlorides, etc. This build-up causes a thinning or weakening in the walls of the individual tubes which ultimately results in their failure. In an effort to overcome these problems resulting from build-up around the tubes, supporting grid structures comprising a plurality of separate grids have been used in place of the steel plates, such as used in the typical prior art steam generator of FIG. 1. An example of such structures are disclosed in U.S. Pat. Nos. 4,021,204 and 4,036,461 which disclose grid-type tube supports wherein the individual grids consist of wide sections which are intersected by thin sections to define the grid apertures, similar to the arrangement shown in FIG. 10, except for the presence of flow holes. Nevertheless, build-up may still occur around the tubes, although it is considerably less than in other prior art arrangements.

The accepted manner presently used for detecting any potential weakening or thinning in the walls of the individual tubes consists of eddy current testing in which current is applied from the tube sheet through the tubes to measure the wall thickness or discontinuance. However, at the location where the tube passes the grid, or a drilled hole plate if one is employed instead, it is difficult to get accurate eddy current readings due to considerable interference by the grid. Thus, such eddy current testing has not proven satisfactory in accurately detecting potential or actual failure of the tubes at the critical points where they pass through the individual grids.

These disadvantages of the prior art are overcome by the present invention.

SUMMARY OF THE INVENTION

An improved steam generator for use in a nuclear power plant of the pressurized water type in which a turbine generator is driven by the steam output of the steam generator for providing electrical power therefrom and the steam generator is powered by a nuclear energy heat source comprises a vertically extending hollow outer housing having an upper housing portion and a lower housing portion with the lower housing portion having heat exchange fluid and feed water inlets and a vertically extending bundle within the interior thereof in flow through communication with the heat exchange fluid, and a vertically movable grid structure means vertically extending within the interior of the lower housing portion, with the tubes vertically extending through the grid structure which defines grid apertures through which the individual tubes extend, with each of the grid apertures being in surrounding relationship with a portion of an associated one of the tubes. Means, such as hydraulic means, such as a piston, are provided for vertically moving the grid structure a predetermined vertical extent along the tubes for vertically displacing the grids defining the grid apertures by a sufficient amount for removing the previously surrounded portion of each of the tubes from the associated grid apertures for enabling an enhanced reading of the condition of the tubes at the previously surrounded portion. The interior wall of the lower housing portion further comprises guide means vertically extending along the interior wall which are communicable with guide means in the grid structure of guiding the vertical movement of the grid structure. The aforementioned grid structure comprises a plurality of vertically spaced apart grids which are interconnected in vertically spaced relationship by vertically extending spacer members, such as rods. The individual grids preferably comprise an intersecting arrangement of narrow and wide members whose intersection defines the grid apertures with the wide members further comprising apertures therein for enabling flow of secondary fluid therethrough for providing a washing action about the grids.

The steam generator may comprise a vertically assemblable modular structure in which instance the modular structure preferably comprises a base module, a tube bundle module removably mountable on the base module in sealing relationship therewith and an uppermost drier module removably mountable on the tube bundle module in sealing relationship therewith for providing the vertically assemblable modular structure. The vertically assemblable base module and tube bundle module comprise the aforementioned lower housing portion of the steam generator and the drier module comprises the upper housing portion of the steam generator.

The dryer module has a steam outlet at one end thereof which is communicable with the turbine for providing steam generated within the steam generator to the turbine and a moisture separator means within the interior thereof in communication with the steam outlet for drying the generated steam provided to the steam outlet. The other end of the dryer module has a closure flange. The tube bundle module has a closure means, such as a closure flange, at the upper end thereof and a closure flange at the lower end thereof and contains the aforementioned vertically extending tube bundle therein through which the heat exhcange fluid flows for enabling the provision of the steam. The tube bundle has a tube sheet at one end thereof for supporting the tube bundle with the tubes comprising the tube bundle extending through the tube sheet in flow through communication with heat exchange fluid provided thereto. The tube bundle module also contains a feedwater inlet through which feedwater is provided for conversion into steam. The tube sheet comprises the lower end closure flange of the tube bundle module. The dryer module closure flange and the tube bundle module upper closure means effectuate the aforementioned sealing relationship between the tube bundle module and the dryer module.

The base module uppermost portion has an outer shell having a tapered interior wall with the base module having the heat exchange fluid inlet therein which is in flow through communication with the vertically assembled tube module tube bundle. The exterior surface of the tube sheet closure flange is tapered complementary to the base module outer shell interior wall tapered portion and removably receivable therein for forming the aforementioned sealing relationship between the tube bundle module and the base module, with the associated weight of the vertically assembled dryer module and tube bundle module on the tube sheet closure flange effectuating the sealing relationship between the base module and the tube bundle module for facilitating closure by the tube sheet closure flange, whereby ready access to and removal of the tube bundle module in situ from the nuclear plant steam generator is facilitated. Thus, the entire associated weight of the vertically assembled dryer and tube bundle modules is supported on the base module. Removable locking means are provided for lockably retaining the modules comprising the steam generator in vertically assembled relation. The vertically assembled modular nuclear steam generator is contained within a containment building structure therefor and may be disassembled for enabling repair of the steam generator without breaking or destroying the containment building structure.

BRIEF DESCRIPTION OF DRAWINGS

FIG. 2 is a diagrammatic illustration, partially in section, of a modular vertically assembled steam generator having a movable grid structure in accordance with the present invention diagrammatically illustrated in situ in a containment building in a nuclear power plant;

FIG. 3 is a fragmentary diagrammatic illustration, partially in section, of the manner of locking the closure flange arrangement between the tube bundle module and the base module of the embodiment of FIG. 2;

FIG. 4 is a view similar to FIG. 3 of an alternative embodiment for removably locking the closure arrangement of FIG. 3;

FIG. 8 is a perspective view of the grid structure arrangement of the embodiment of FIG. 2, with the tubes removed for purposes of clarity, including illustrative means for accomplishing vertical displacement of said grid structure;

FIG. 9 is a sectional view of the embodiment of FIG. 2 taken along line 9—9 with the tubes removed for purposes of clarity so as to illustrate the guiding relationship between the grid structure and the housing interior wall;

FIG. 10 is a fragmentary diagrammatic illustration, partially in section, of a typical preferred grid in the grid structure showing the tubes passing therethrough;

FIG. 11 is an enlarged, fragmentary diagrammatic illustration, partially in section, showing potential build-up around the tube as it passes through the grid; and FIG. 12 is a fragmentary diagrammatic illustration of an alternative arrangement for accomplishing vertical movement of the grid structure in the embodiment of FIG. 2.

DETAILED DESCRIPTION OF PREFERRED EMBODIMENTS

Figure 1:
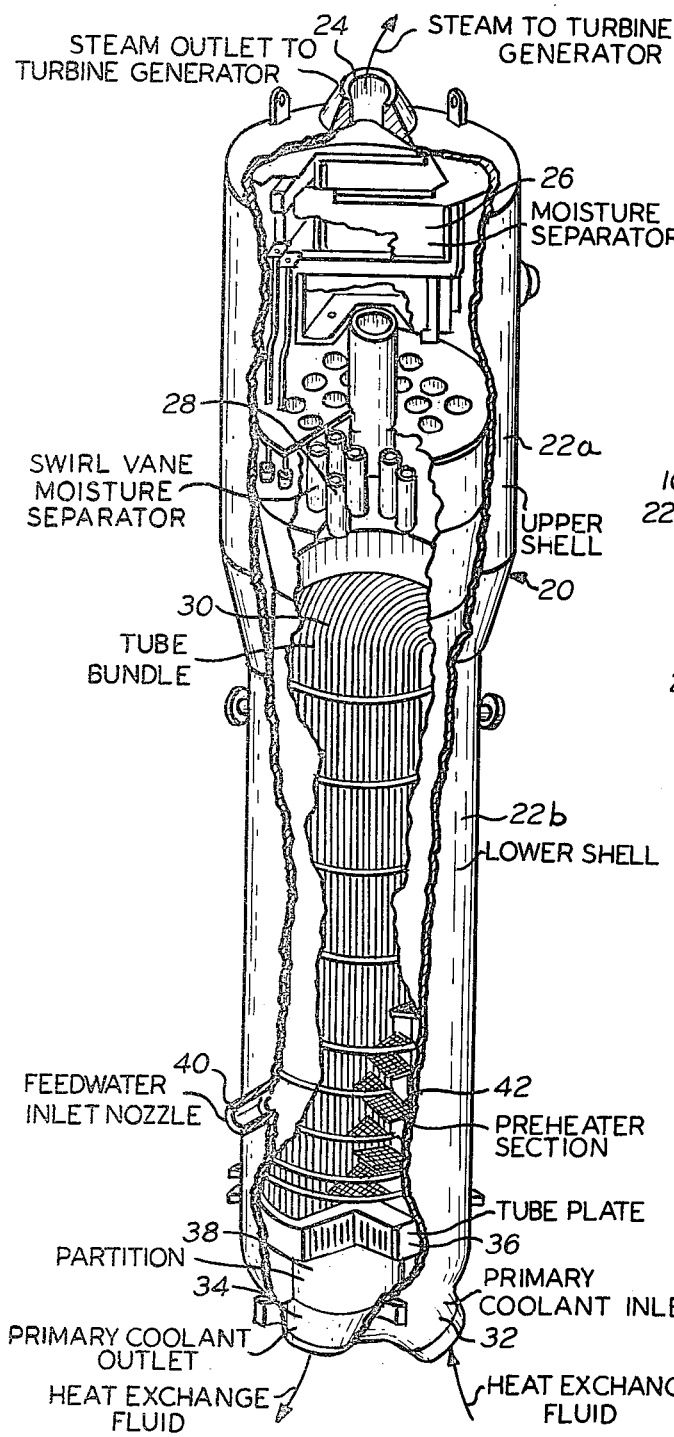
FIG. 1 is a cut away view in perspective of a prior art typical steam generator of the type used in nuclear power plants.

Referring now to the drawings in detail, and initially to FIG. 1 thereof, FIG. 1 is a cut away view, in perspective, of a typical conventional steam generator of the type used in nuclear power plants of the pressurized water type. In such power plants, the steam generator, generally referred to by the reference numeral 20, provides steam to a conventional turbine generator (not shown) which is powered thereby to provide electrical power therefrom in conventional fashion. In such nuclear power plants, an atomic reactor provides the nuclear energy heat source which ultimately "powers" the steam generator 20, such a nuclear reactor not being shown in FIG. 1. As shown in FIG. 1, the conventional prior art steam generator 20 includes an outer housing or shell 22 comprising an upper shell portion 22a and a lower shell portion 22b. As shown in FIG. 1, this shell or housing 22 is conventionally fabricated as an integral structure. As is well known, such steam generators 20 for use in nuclear power plants are normally vertically arranged in use in the manner shown in FIG. 1 and are preferably contained within a containment building, such as one preferably formed of concrete. Such a containment building is not shown in FIG. 1 but is diagrammatically illustrated in FIG. 2 which refers to the preferred embodiment of the steam generator 21a of the present invention.

Referring once again to FIG. 1, at the upper portion of the steam generator 20, namely the upper portion of the upper shell 22a, a steam outlet 24 is provided which is coupled in flow through communication with the turbine generator (not shown) for providing the aforementioned steam thereto. The upper shell portion 22a also preferably contains a conventional moisture separator 26 and a conventional swirl vane moisture separator 28 for drying the steam prior to its provision to the steam outlet 24. The lower shell portion 22b of the conventional steam generator 20 preferably contains a conventional tube bundle 30 through which heat exchange fluid normally flows. The heat exchange fluid is normally provided to the tube bundle 30 through a conventional inlet 32 therefor and flows out of the steam generator 20 through a conventional outlet 34 therefor. The heat exchange fluid inlet 32 and outlet 34 are in flow through communication with the tube bundle 30. The tube bundle 30 is conventionally supported in a conventional tube plate or tube sheet 36 through which the tubes comprising the tube bundle 30 extend so as to be in flow communication with the heat exchange fluid inlet and outlet 32 and 34, respectively. A conventional partition 38 is provided to separate the heat exchange fluid flowing through the inlet 32 from the heat exchange fluid flowing through the outlet 34. Feedwater which is conventionally converted into steam by steam generator 20 is preferably fed thereto through a conventional feedwater inlet nozzle 40 contained in the lower shell portion 22b. As also illustated in FIG. 1, the tube bundle 30 also contains a conventional pre-heater section 42. Since the operation of the steam generator 20 is conventional, it will not be described in greater detail hereinafter. Suffice it to say that steam generator 20 may be any typical conventional steam generator, such as the type conventionally manufactured by Westinghouse for use in nuclear power plants of the pressurized water type.

Referring now to FIG. 2, a diagrammatic representation of the preferred embodiment 20a of the modular steam generator of the present invention is shown. Identically functioning components in the modular steam generator 20a which are identical with those previously described with reference to FIG. 1 have the same reference numerals as used in FIG. 1. Thus, as can be seen in FIG. 2, one of the differences between the steam generator 20a of FIG. 2 and the steam generator 20 of FIG. 1 is in the modular arrangement, which modular arrangement is the subject of my copending patent application, U.S. Ser. No. 792,195, filed Apr. 29, 1977. Another significant difference between the steam generator 20a of FIG. 2 and both the steam generator of FIG. 1 and my aforementioned copending patent application is in the provision of a grid structure arrangement 200 for supporting the individual tubes of the tube bundle 30 and the provision of an arrangement, such as a hydraulic system 202, for enabling vertical displacement of the entire grid structure 200 to facilitate testing of the condition of the tubes, such as by conventional eddy current testing. As shown and preferred in FIG. 2, the preferred grid structure arrangement 200-200 is employed in the preferred modular arrangement of my copending patent application, U.S. Ser. No. 792,195, filed Apr. 29, 1977.

Thus, as is shown and preferred in FIG. 2, modular steam generator 20a preferably consists of three separate and distinct modules 50, 52 and 54. Module 50 is termed the base module and, as will be described in greater detail hereinafter, is the portion of the modular steam generator 20a which supports the entire weight of the modules 52 and 54 vertically assembled there above. Module 52 is termed the tube bundle module which is vertically assembled above the base module 50 and supported thereon. Tube module 52 preferably contains the tube bundle 30, the grid structure arrangement 200, hydraulic system 202, the feedwater inlet 40, the aforementioned preheater section 42 if such is utilized, and the aforementioned tube plate or tube sheet 30a. As will be described in greater detail hereinafter, tube bundle module 52 is vertically assembled on base module 50 and supported thereon in sealing relationship with the tubes comprising the tube bundle 30 preferably in flow through communication with the heat exchange fluid inlets and outlets 32 and 34, respectively, and with the individual tubes vertically extending through the grid structure arrangement 200, as will be described in greater detail hereinafter with reference to FIGS. 8–12. The heat exchange fluid inlets and outlets 32 and 34, respectively, are preferably contained in the base module 50 as is, of course, the partition 38 therebetween.

As also shown and preferred in FIG. 2, the tube sheet or tube plate 36a preferably forms a closure flange at the lower portion of tube bundle module 52 as well as serving as the tube plate for tube bundle 30. A separate closure flange 56 is located at the uppermost end of tube bundle module 52 for effectuating sealing relationship between the tube bundle module 52 and dryer module 54. This sealing relationship is effectuated by a mating relationship between closure flange 56 of tube bundle module 52 and a closure flange 58 located at the bottom or lowermost portion of dryer module 54. The steam outlet 24 is located in the uppermost portion of dryer module 54. Moreover, as shown and preferred, dryer module 54 contains the moisture separator 26 and the swirl vane moisture separator 28 within the interior thereof, with separators 26 and 28 being arranged in flow through communication with the steam provided from the tube bundle module 52 when the modular steam generator 20a is vertically assembled as shown in FIG. 2. With respect to the interconnection between the dryer module 54 and the tube bundle module 52, if desired, conventional locking means, such as threaded bolts 60 and 62 by way of example, may extend through the mated closure flanges 56 and 58 to retain them in vertically assembled position, with these bolts 60 and 62 being removed when it is desired to separate the dryer module 54 from the tube bundle module 52.

With respect to the sealing relationship between the tube bundle module 52 and the base module 50, this is preferably accomplished by providing the exterior surface 64 of the tube sheet 36a with a taper which is complementary to a taper provided in the interior wall 66 of the upper portion of base module 50. In addition, as shown and preferred in FIGS. 2 through 4, this upper portion of base module 50 is preferably formed with a lip 68 upon which the bottom of the tube sheet 36a rests. The complementary tapers 64 and 66 are such that these surfaces are mateable so as to provide the aforementioned sealing relationship. If desired, a gasket, such as one formed of a metallic substance, can be provided between these mateable surfaces 64 and 66 so as to effectuate a tighter seal.

As shown and preferred in FIG. 3, although the associated weight of the vertically assembled dryer module 54 and tube bundle module 52 on the tube sheet 36a is sufficient to effectuate the aforementioned sealing relationship, locking means are preferably provided for insuring that the tube bundle module 52 and the base module 50 remain intact in vertically assembled relation. As shown in FIG. 3, such a locking means may comprise a threadable bolting means 70 which is threaded through the wall of base module 50 so as to bear against exterior surface 64 in a friction engagement, with the bolts 70 bearing against this exterior surface 64 from opposite sides as illustrated in FIG. 2. In addition, if desired, a threaded hole can be provided in the respective sides of the tube plate 36a for allowing the bolts 70 to extend thereinto.

FIG. 4 illustrates an alternative embodiment for locking the tube sheet 36a to the base module 50. In the embodiment of FIG. 4, a vertically extendable bolt 72 is vertically threaded through the tube sheet 36a and therefrom through the lip portion 68 of the base module 50.

Dryer module 54 of the modular steam generator 20a preferably comprises the equivalent of the upper shell portion 22a of steam generator 20 shown in FIG. 1, and the tube bundle module 52 and base module 50, taken together, when vertically assembled preferably comprise the equivalent of lower shell portion 22b of the steam generator 20 of FIG. 1. Moreover, as illustratively shown in FIG. 2 the modular steam generator 20a is preferably contained in a concrete containment building 80, diagrammatically illustrated therein, as is the balance of the power generation system. Thus, in vertically assembling the modular steam generator 20a, as well as in disassembling the steam generator 20a, the lifting, and hence, assembly, operations must normally take place from above so as not to destroy the containment building 80. The base module 50 is normally permanently mounted within the containment building 80 for enhanced support. The tube bundle module 52 may then be vertically lowered down into position in base module 50 with the weight of the tube bundle module 52 on the tube sheet 36a helping to effectuate the sealing relationship between the mating surfaces 64 and 66 and with the tube sheet 36a resting on lip 68. Of course, during initial assembly, the containment building 80 could be constructed after assembly of the steam generator 20a. The dryer module 54 is then vertically lowered onto closure flange 56 so that closures flanges 58 and 56 are in mating relationship with any through hole threaded apertures required for bolts 60 and 62. Thereafter, locking means 70, 60 and 62 may be inserted to hold the vertically assembled modules 54, 52 and 50 in vertically assembled relation. Similarly, when it is desired to disassemble the modular steam generator 20a so as to repair any of the various component parts thereof, the locking means 60, 62 and 70 are removed and then the dryer module may be vertically lifted away from the tube bundle module 52 and, thereafter, the tube bundle module 52 may be vertically lifted away from base module 50 and out of the containment building 80 without destroying the containment building. Such vertical lifting can conventionally be accomplished by the type of aerial cranes normally in use in such conventional nuclear power plants. Arrows 82 and 84 illustrate the vertical directions for removal and assembly of the modules 54 and 52 to base module 50.

Referring now to FIGS. 8–12, in addition to FIG. 2, the preferred grid structure arrangement 200 and hydraulic system 202 for vertically displacing the grid structure 202 in the modular steam generator 20a of FIG. 2 shall be described. The grid structure arrangement 200 preferably provides a plurality of spaced apart horizontal tube supports for the individual tubes comprising the tube bundle 30. In conventional prior art steam generators, such as ones employing a grid structure, such as described in U.S. Pat. Nos. 4,021,204 and 4,036,461, the grids are separate individual elements which are permanently welded to the inner wall of the steam generator. In the presently preferred grid structure arrangement 200, however, the individual grids, seven such grids 204, 206, 208, 210, 212, 214 and 216, respectively, being shown by way of example in FIGS. 2 and 8, are preferably tied together to form a composite grid structure 200 which, as will be explained in greater detail hereinafter, is preferably vertically displaceable within the interior of the lower housing portion tube bundle module 52. The grids 204, 206, 208, 210, 212, 214 and 216 are preferably tied together by rods 218 spaced about the periphery of each of the individual grids 204–216, inclusive, which preferably provide substantially equal vertical spacing between adjacent grids. If desired, any other conventional vertical spacing member may be used in place of the rods 218.

As is also shown and preferred in FIGS. 2 and 8, the preferred steam generator 20a of the present invention also includes an arrangement for vertically displacing or moving the grid structure 202 in the directions of arrow 84. Preferably, this arrangement comprises a hydraulic system 202 which is powered by a conventional external hydraulic pressure source 220 such as one providing a pressurized hydraulic fluid. The hydraulic pressure source 220 is preferably conventionally connected via a conventional pressure fitting 222 extending through the wall of tube bundle module 252 into a conventional collector ring or pipe 224. As shown and preferred in FIG. 8, this collector ring 224 preferably conventionally cooperates with a plurality of hydraulical cylinders, six such cylinders 226a, 226b, 226c, 226d, 226e and 226f being shown by way of example, which are spaced circumferentially about the periphery of collector ring 224. Each of the cylinders 226a–226f, inclusive, includes a hydraulically operated piston rod 228a–228f, respectively, whose power stroke in each direction is equivalent to the desired extent of vertical displacement of the grid structure 202. Preferably, by way of example, the upward vertical displacement is in the range between 4–6 inches, as is the return or downward vertical displacement, with the hydraulic system 202 preferably lifting the entire grid structure 200 the aforementioned 4–6 inches from its rest or normal use position when activated by the hydraulic pressure source 220. The various hydraulic cylinders 226a-226f, inclusive, have conventional means for locking the piston in the upstroke or retracted position which occurs at the completion of the lifting of the grid structure 200 the predetermined extent determined by the full upstroke of the various pistons 228a-228f, inclusive, all of which preferably simultaneously operate to accomplish the desired lifting.

As further shown and preferred in FIGS. 2 and 9, guide means are preferably provided in both the grid structure 200 and the interior wall of the lower housing portion tube bundle module 252 for facilitating the proper vertical movement or displacement of the grid structure 200. Preferably, the guide means comprises a plurality of runner segments associated with each of the grids 204-216, inclusive, which segments 232 are permanently welded to the inner wall of the steam generator 20a. As shown and preferred in FIG. 8 as well as in FIG. 9, each of the grids 204-216, inclusive, preferably includes a plurality of circumferentially spaced cut out or V'ed out portions 230 which are complementary to and communicate with the various associated runner segments 232 so as to facilitate the vertical displacement of the grid structure arrangement 200.

Referring to FIGS. 10 and 11, each of the individual grids 204-216, inclusive, is preferably similar to the type described in U.S. Pat. Nos. 4,036,461 and 4,021,204, with the exception of the provision of spaced apart through holes 240 in the wide or heavy sections 242 which intersect with narrow or thin sections 244 as described in U.S. Pat. Nos. 4,036,461 and 4,021,204. The purpose of the through holes 240 is to lighten the weight of the heavy sections 242 as well as to act as flow holes through the secondary fluid may flow to facilitate the washing action of the grids 204-216, inclusive. Also shown and preferred in FIGS. 10 and 11, the intersecting elements 242 and 244 of each of the grids 204-216, inclusive, define grid apertures 246 through which the individual tubes 30a comprising the tube bundle 30 vertically extend with these elements 242-244 defining the associated grid apertures 246 being in surrounding relationship with respect to each of the individual tubes 30a extending therethrough.

As illustratively shown FIG. 11, the grid apertures 246 defines by the intersecting narrow members 244 and wide members 242, often function as a contact point where build up of secondary water chemicals occurs. Such build up, illustratively represented by blackened areas 248, can eat away at the tube 30a walls so as to thin them out and eventually cause them to fail, such as represented by the dotted lines 250 in FIG. 11. In accordance with the present invention, in order to detect such thinning or deterioration in the walls of the individual tubes 30a by use of the conventional eddy current testing method, the grid structure arrangement 200 is vertically displaced a sufficient amount so as to expose or remove the portion of each of the tubes 30a which was previously surrounded by the intersecting elements 244 and 242 defining the grid apertures 246, from its associated grid aperture 246 to thereby enable a reading of the condition of the tube 30a at the previously surrounded portion without any interference from the associated grids 204 through 216, inclusive. As was previously mentioned, this is preferably accomplished by hydraulically activating hydraulic cylinders 266a through 266f, inclusive, which causes pistons 228a through 228f, inclusive, to go through an up-stroke of sufficient extent to accomplish the above. As also previously mentioned, when using the grid structure of the type described in U.S. Pat. Nos. 4,036,461 and 4,021,204, a vertical movement of between 4 to 6 inches has proven to be sufficient. In addition, conventional stops (not shown) may be provided at the ends of each of the runners 232 to further limit the vertical displacement of the grid structure 200 in each of the directions indicated by arrow 84 as well as to acts as a further support for the various grids 204 through 216 in the down or rest position of the grid structure arrangement 200.

Thus, in employing the vertically displaceable grid structure arrangement 200 of the present invention in connection with eddy current testing of the tube bundle 30, a reading would first be taken of the entire tube bundle 30 prior to any vertical shift or displacement of the grid structure arrangement 200 and then the grid structure arrangement would be vertically displaced as previously described and a second reading taken and compared with the first reading. If desired, the second reading could solely be of the shifted zone or portion of the tube bundle 30 as opposed to the entire tube bundle. As previously mentioned, this vertical displacement is solely accomplished by means of the hydraulic cylinders 226a through 226f in cooperation with the piston rods 228a through 228f, inclusive, respectively. If desired, however, as shown in FIG. 12 by way of example, the hydraulic system 202 previously described could be replaced by a conventional hydraulically operated cylindrical bellows 260 in place of the hydraulic cylinder-piston arrangement 226-228 previously described. Moreover, the vertical displacement or shifting of the grid structure arrangement 200 could be accomplished in several other ways, such as one utilizing the internal pressure of the steam generator 20a to cause the vertical displacement or manually through the use of the existing hand holes which are provided in a conventional steam generator 20a.

It should be noted that preferably the tubes 30a comprising the tube handle 30 have their walls constructed of polished stainless steel with the tubes 30a not directly laying on the individual grids 204 through 216, inclusive. It should also be noted that preferably the hydraulic system 202 is located in the lower housing portion just above the U bend in the tube bundle 30.

Figure 5:
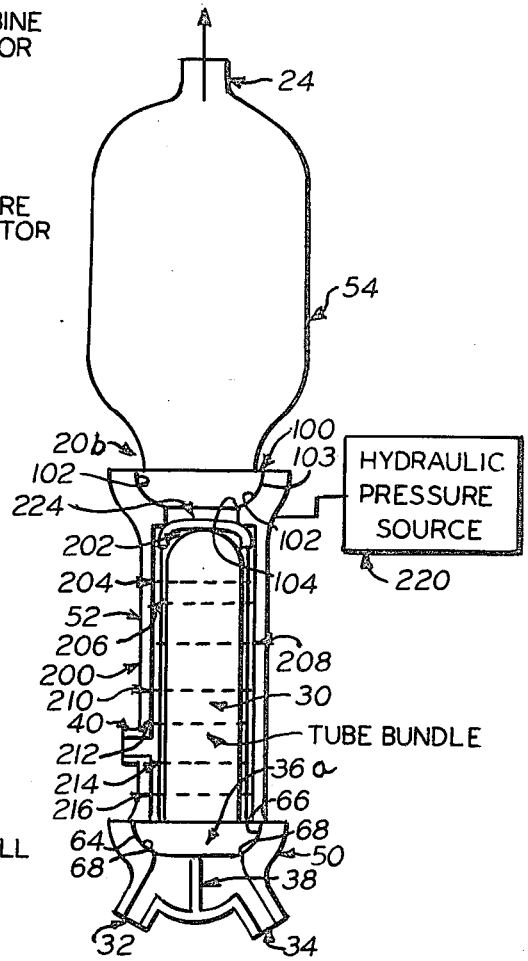
FIG. 5 is a diagrammatic illustration, partially in section, similar to FIG. 2, of an alternative embodiment for providing the sealing relationship between the dryer module and the tuble bundle module.

Referring now to FIG. 5, an alternative embodiment of the modular steam generator 20a of FIG. 2 is shown, with this embodiment being designated by the reference numeral 20b. Preferably, modular steam generator 20b is identical with modular steam generator 20a except for the manner of effectuating the sealing relationship between dryer module 54 and tube bundle module 52. Thus, closure flanges 56 and 58 of modular steam generator 20a are replaced by a tapered closure flange 100 at the bottom of dryer module 54 and a complementary tapered interior wall portion 102 at the uppermost portion of tube bundle module 52. The relationship between the tapered closure flange 100, having a tapered exterior surface 103 which is complementary to the tapered interior surface 102 of the uppermost portion of the tube bundle module 52, is preferably functionally identical to that previously described with reference to the relationship between surfaces 64 and 66. Thus, in addition to the mating relationship between surfaces 102 an 103, a lip 104 similar to lip 68 is also provided upon which the bottom surface of closure flange 100 rests. In addition, if desired, a gasket, such as a metallic substance gasket, may be provided between mateable surfaces 103 and 102 for further effectuating the sealing relationship therebetween. Thus, in the arrangement of FIG. 5, the associated weight of the dryer module 54 upon closure flange 100 effectuates the aforementioned sealing relationship. The grid structure arrangement 200 and hydraulic system 202 are preferably identical with that previously described with reference to the embodiment 204 of FIG. 2.

Figure 6:
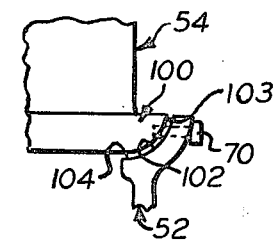
FIG. 6 is a view similar to FIG. 3 of the locking arrangement between the dryer module and tube bundle module in the embodiment of FIG. 5.
Figure 7:
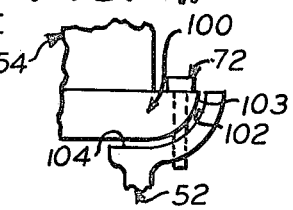
FIG. 7 is a view similar to FIG. 4 of an alternative embodiment of the locking arrangement of FIG. 6.

FIGS. 6 and 7 illustrate arrangements similar to FIGS. 3 and 4, respectively, for locking the tapered closure flange 100 to the tube bundle module 52. FIG. 6 illustrates employment of the locking means 70 previously described with reference to FIG. 3 for locking the tapered closure flange 100 of dryer module 54 to the tube bundle module 52, which locking may be accomplished in the identical manner previously described with reference to FIG. 3. Similarly, FIG. 7 illustrates the use of locking means 72 for locking the closure flange 100 of dryer module 54 to the tube bundle module 52 through lip 104, with such locking being accomplished in the identical manner as previously described with reference to FIG. 4. Thus, in the modular steam generator 20b illustrated in FIG. 5, the associated weight of the dryer module 54 on closure flange 100 effectuates the sealing relationship between the dryer module 54 and the tube bundle module 52, and the combined associated weight of dryer module 54 and tube bundle module 52 on the tube sheet 36a closure flange effectuates the sealing relationship between the tube bundle module 52 and base module 50 in the vertically assembled modular steam generator 20b.

By utilizing the modular steam generator of the present invention, which is used in nuclear power plants of the pressurized water type, ready access to and removal of the tube bundle module in situ from the nuclear power plant steam generator without destruction of the containment building may be accomplished, a modular steam generator may be provided in which all of the primary piping may remain intact, and the entire weight of the vertically assembled modular steam generator may be supported from the base module therefor. In addition, by utilizing the vertically displaceable grid structure arrangement in such steam generators, modular or otherwise, the build-up on the tubes at the contact point with the tube support grids is reduced and a more accurate reading of the condition of the tubes at such contact point is possible.

What is claimed is:

1. In a steam generator for use in a pressurized water nuclear power plant in which a turbine generator is driven by the steam output of said steam generator to provide electrical power therefrom and said steam generator is powered by a nuclear energy heat source, wherein said steam generator comprises a vertically extending hollow outer housing having an upper housing portion and a lower housing portion, with said upper housing portion having a steam outlet therein communicable with the turbine generator for providing steam generated within said steam generator to said turbine generator and a moisture separator means within the interior thereof in communication with said steam outlet for drying the generated steam provided to said steam outlet, and with said lower housing portion having heat exchange fluid and feedwater inlets and a vertically extending tube bundle within the interior thereof in flow through communication with said heat exchange fluid for enabling heat exchange fluid provided through said inlet therefor to flow through said tube bundle for providing said generated steam from feedwater provided through said inlet therefor, said tube bundle having a tube sheet at one end thereof for supporting said tube bundle with the tubes comprising said tube bundle extending through said tube sheet in said flow through communication with said heat exchange fluid inlet; the improvement comprising vertically movable grid structure means vertically extending within the interior of said lower housing portion, said grid structure means comprising a plurality of vertically spaced apart grid, said tubes vertically extending through said grid structure means with said grid structure means defining grid apertures therein through which said individual tubes comprising said tube bundle extend, each of said grids comprising an intersecting arrangement of narrow and wide members whose intersection defines said grid apertures, each of said grid apertures being in surrounding relationship with a portion of an associated one of said tubes, and means for vertically moving said grid structure a predetermined limited vertical extent within the interior of said lower housing along said tubes for vertically displacing said intersecting arrangement defining said grid apertures from a normal used position by a sufficient amount for removing the portion of each of said tubes previously surrounded by said intersecting arrangement in said normal use position from said previous surrounding relationship for enabling an enhanced reading of the condition of said tubes at said previously surrounded portion to be taken.

2. A steam generator in accordance with claim 1 wherein said wide members comprise apertures therein for enabling flow of secondary fluid therethrough for providing a washing action about said grids.

3. In a steam generator for use in a pressurized water nuclear power plant in which a turbine generator is driven by the steam output of said steam generator to provide electrical power therefrom and said steam generator is powered by a nuclear energy heat source, wherein said steam generator comprises a vertically extending hollow outer housing having an upper housing portion and a lower housing portion, with said upper housing portion having a steam outlet therein communicable with the turbine generator for providing steam generated within said steam generator to said turbine generator and a moisture separator means within the interior thereof in communication with said steam outlet for drying the generated steam provided to said steam outlet, and with said lower housing portion having heat exchange fluid and feedwater inlets and a vertically extending tube bundle within the interior thereof in flow through communication with said heat exchange fluid for enabling heat exchange fluid provided through said inlet therefor to flow through said tube bundle for providing said generated steam from feedwater provided through said inlet therefor, said tube bundle having a tube sheet at one end thereof for supporting said tube bundle with the tubes comprising said tube bundle extending through said tube sheet in said flow through communication with said heat exchange fluid inlet; the improvement comprising vertically movable grid structure means vertically extending within the interior of said lower housing portion, said tubes vertically extending through said grid structure means with said grid structure means defining grid apertures therein through which said individual tubes comprising said tube bundle extend, said grid structure means comprising an intersecting arrangement of narrow and wide members whose intersection defines said grid apertures, each of said grid apertures being in surrounding relationship with a portion of an associated one of said tubes, and means for vertically moving said grid structure a predetermined limited vertical extent within the interior of said lower housing along said tubes for vertically displacing said intersecting arrangement defining said grid apertures from a normal use position by a sufficient amount for removing the portion of each of said tubes previously surrounded by said intersecting arrangement in said normal use position from said previous surrounding relationship for enabling an enhanced reading of the condition of said tubes at said previously surrounded portion.

4. A steam generator in accordance with claim 3 wherein said wide members comprise apertures therein for enabling flow of secondary fluid therethrough for providing a washing action about said grid structure means.

5. In a steam generator for use in a pressurized water nuclear power plant in which a turbine generator is driven by the steam output of said steam generator to provide electrical power therefrom and said steam generator is powered by a nuclear energy heat source, wherein said steam generator comprises a vertically extending hollow outer housing having an upper housing portion and a lower housing portion, with said upper housing portion having a steam outlet therein communicable with the turbine generator for providing steam generated within said steam generator to said turbine generator and a moisture separator means within the interior thereof in communication with said steam outlet for drying the generated steam provided to said steam outlet, and with said lower housing portion having heat exchange fluid and feedwater inlets and a vertically extending tube bundle within the interior thereof in flow through communication with said heat exchange fluid for enabling heat exchange fluid provided through said inlet therefor to flow through said tube bundle for providing said generated steam from feedwater provided through said inlet therefor, said tube bundle having a tube sheet at one end thereof for supporting said tube bundle with the tubes comprising said tube bundle extending through said tube sheet in said flow through communication with said heat exchange fluid inlet; the improvement comprising vertically movable grid structure means vertically extending within the interior of said lower housing portion, said tubes vertically extending through said grid structure means with said grid structure means defining grid apertures therein through which said individual tubes comprising said tube bundle extend, each of said grid apertures being in surrounding relationship with a portion of an associated one of said tubes, and means for vertically moving said grid structure a predetermined limited vertical extent within the interior of said lower housing along said tubes for vertically displacing said means defining said grid apertures from a normal use position by a sufficient amount for removing the portion of each of said tubes previously surrounded by said grid aperture defining means in said normal use position from said previous surrounding relationship for enabling an enhanced reading of the condition of said tubes at said previously surrounded portion, said steam generator further comprising a base module, a tube bundle module removably mountable on said base module in sealing relationship therewith, and an uppermost dryer module removably mountable on said tube bundle module in sealing relationship therewith for providing a vertically assemblable modular structure for said steam generator, said vertically assembled base module and tube bundle module comprising said lower housing portion, and said dryer module comprising said upper housing portion, said dryer module having said steam outlet, said dryer module closure flange comprising a flange having a tapered exterior surface and said tube bundle module comprising an outer shell with said upper end closure means comprising a tapered interior wall in said outer shell, said dryer module flange tapered exterior surface being tapered complementary to said tube bundle module outer shell tapered interior wall and removably receivable therein for forming said sealing relationship between said dryer module and said tube bundle module with the associated weight of said vertically assembled dryer module on said dryer module closure flange effectuating said sealing relationship between said dryer module and said tube bundle module for facilitating closure by said dryer module closure flange.

6. A steam generator in accordance with claim 5 further comprising locking means for removably locking said vertically assembled dryer module to said vertically assembled tube bundle module and said vertically assembled tube bundle module to said base module for removably maintaing said modules in vertically assembled relation.

7. A steam generator in accordance with claim 6 wherein said removable locking means comprises vertically removable bolting means.

8. In a steam generator for use in a pressurized water nuclear power plant in which a turbine generator is driven by the steam output of said steam generator to provide electrical power therefrom and said steam generator is powered by a nuclear energy heat source, wherein said steam generator comprises a vertically extending hollow outer housing having an upper housing portion and a lower housing portion, with said upper housing portion having a steam outlet therein communicable with the turbine generator for providing steam generated within said steam generator to said turbine generator and a moisture separator means within the interior thereof in communication with said steam outlet for drying the generated steam provided to steam outlet, and with said lower housing portion having heat exchange fluid and feedwater inlets and a vertically extending tube bundle within the interior thereof in flow through communication with said heat exchange fluid for enabling heat exchange fluid provided through said inlet therefor to flow through said tube bundle for providing said generated steam from feedwater provided through said inlet therefor, said tube handle having a tube sheet at one end thereof for supporting said tube bundle with the tubes comprising said tube handle extending through said tube sheet in said flow through communication with said heat exchange fluid inlet; the improvement comprising vertically movable grid structure means vertically extending within the interior of said lower housing portion, said tubes vertically extending through said grid structure means with said grid structure means defining grid apertures therein through which said individual tubes comprising said tube bundle extend, each of said grid apertures being in surrounding relationship with a portion of an associated one of said tubes, and means for vertically moving said grid structure a predetermined limited vertical extent within the interior of said lower housing along said tubes for vertically displacing said means defining said grid apertures from a normal use position by a sufficient amount for removing the portion of each of said tubes previously surrounded by said grid aperture defining means in said normal use position from said previous surrounding relationship for enabling an enhanced reading of the condition of said tubes at said previously surrounded portion, said steam generator further comprising locking means for removably locking said vertically assembled dryer module to said vertically assembled tube bundle module and said vertically assembled tube bundle module to said base module for removably maintaining said modules in vertically assembled relation.

9. A steam generator in accordance with claim 8 wherein said removable locking means comprises vertically removable bolting means.

* * * * *